United States Patent [19]
Ohira et al.

[11] Patent Number: 4,511,934
[45] Date of Patent: Apr. 16, 1985

[54] VIDEO TAPE RECORDER

[75] Inventors: Takao Ohira, Fujisawa; Daijiro Okihara, Hadano; Makoto Niiro, Sagamihara, all of Japan

[73] Assignee: Sony Corporation, Tokyo, Japan

[21] Appl. No.: 416,328

[22] Filed: Sep. 9, 1982

[30] Foreign Application Priority Data

Sep. 11, 1981 [JP] Japan ................................ 56-144162

[51] Int. Cl.³ ............................................... G11B 5/00
[52] U.S. Cl. ....................................... 360/55; 360/108
[58] Field of Search ..................... 360/55, 64, 108–110

[56] References Cited

PUBLICATIONS

IBM Technical Bulletin, Lundell et al., vol. 9, No. 10, Mar. 1967, p. 1376.

IBM Technical Bulletin, Buslik, vol. 13, No. 10, Mar. 1971, p. 3076.

Primary Examiner—Robert L. Richardson
Attorney, Agent, or Firm—Lewis H. Eslinger; Alvin Sinderbrand

[57] ABSTRACT

A video tape recorder includes a rotary magnetic head drum having a rotating member and a magnetic head mounted on the rotating member, a laser element mounted on the rotating member, a current source for supplying a constant current to the laser element, a circuit for electrically connecting a coil of the magnetic head in parallel with the laser element, a photoelectric conversion member fixed in the video tape recorder, and members for optically coupling the laser element with the photoelectric conversion member.

12 Claims, 7 Drawing Figures

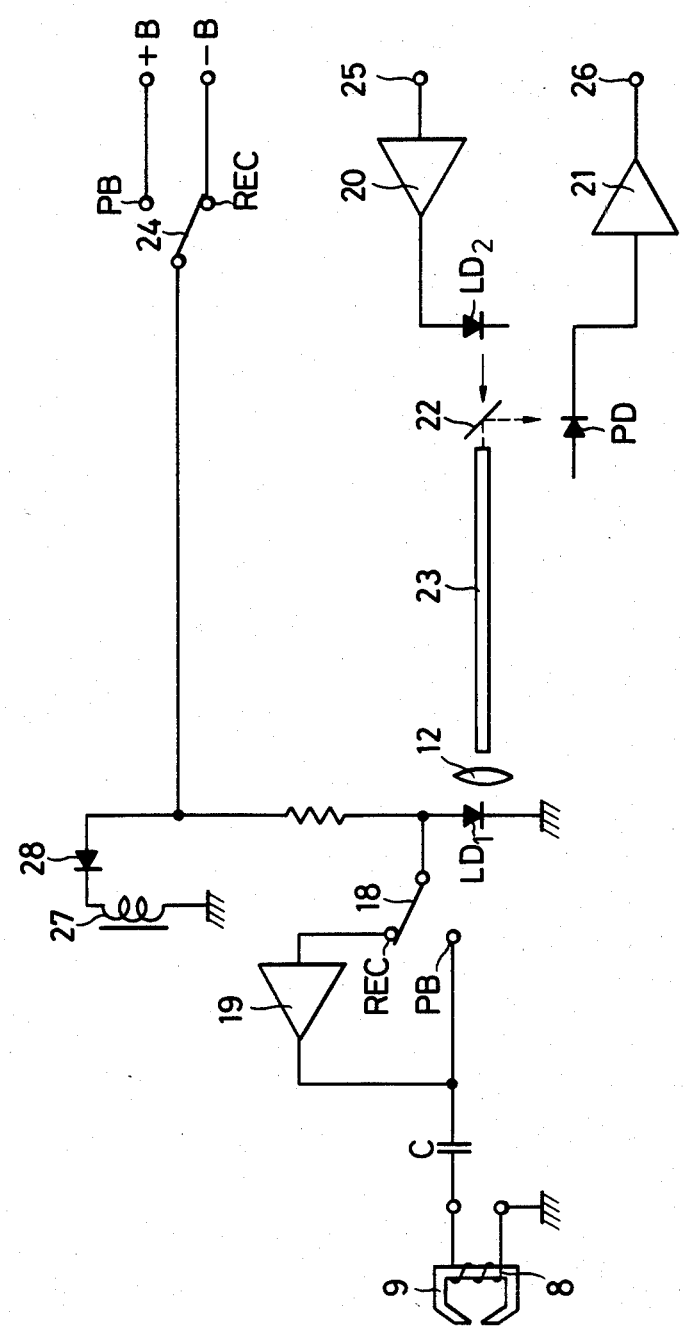

VIDEO TAPE RECORDER

BACKGROUND OF THE INVENTION

1. Field of the Invention

This invention relates to a video tape recorder (VTR) in which video signals are transmitted to, and from a magnetic head.

2. Description of the Prior Art:

A magnetic head is mounted on a rotary drum in a helical scan type VTR. Accordingly, video signals are transmitted through a rotary transformer to, and from the magnetic head. FIG. 1 shows one example 1 of rotary transformers. In the rotary transformer 1, a rotary core 3 is arranged around a stationary core 2. Plural grooves 4 and 5 are formed in the cores 2 and 3, respectively, facing to each other. Coils 6 and 7 are mounted in the grooves 4 and 5, respectively. The rotary core 3 is fixed on the rotary drum (not shown), and rotates therewith. The coils 7 are connected to the magnetic heads which are mounted on the rotary drum. The coils 6 mounted in the stationary core 2 are selectively connected through a change-over switch to a recording circuit and a reproducing circuit in the VTR.

Thus, the video signals are transmitted through magnetic coupling to and from the magnetic heads in the conventional VTR. Accordingly, the conventional VTR has the following defects:

(1) When signals of plural channels are transmitted, distances between the coils 6, and the coils 7 should be so enlarged as to avoid cross talks between the channels. Accordingly, it is very difficult to increase the number of the channels for a definite rotary transformer.

(2) The high frequency characteristic is limited by parasitic capacitance and geometrical size of the rotary transformer. It is difficult to transmit high speed digital signals and broad band signals.

(3) Since the rotary transformer has a resonance characteristic, the impedance matching is limited. There is little freedom of design. Even when the resonant frequency is so designed as to be beyond the band of signals to be transmitted, the signals to, and from the magnetic head have a frequency characteristic influenced by the resonant frequency. When the frequency characteristic is not equalized, and the impedance matching is not obtained, the noise factor S/N is deteriorated.

SUMMARY OF THE INVENTION

Accordingly, it is an object of this invention to provide a video tape recorder in which the above described defects are removed.

In accordance with an aspect of the present invention, a video tape recorder includes a rotary magnetic head drum having a rotating member and a magnetic head mounted on said rotating member, a laser element mounted on said rotating member, a current source for suppling a constant current to said laser element, a circuit for eletrically connecting a coil of said magnetic head in parallel with said laser element, a photoelectric conversion member fixed in said video tape recorder, and members for optically coupling said laser element with said photoelectric conversion member. The above, and other objects, features and advantages of the invention, will be apparent in the following detailed description of illustrative embodiments thereof which is to be read in connection with the accompanying drawings.

BRIEF DESCRIPTION OF THE DRAWINGS

FIG. 7 is a circuit diagram of an important part of a VTR accoring to a second embodiment of this invention in which signals are recorded and reproduced.

DESCRIPTION OF THE PREFERRED EMBODIMENTS

Figure 1:
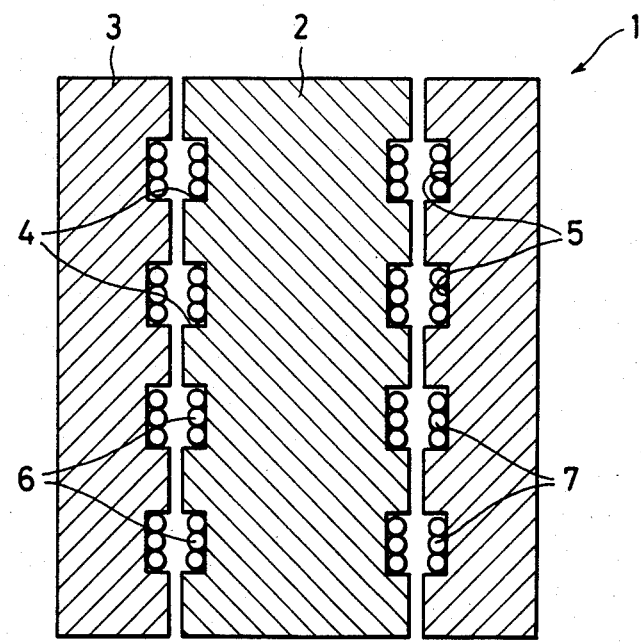
FIG. 1 is a cross-sectional view of a rotary transformer in a conventional VTR.
Figure 2:
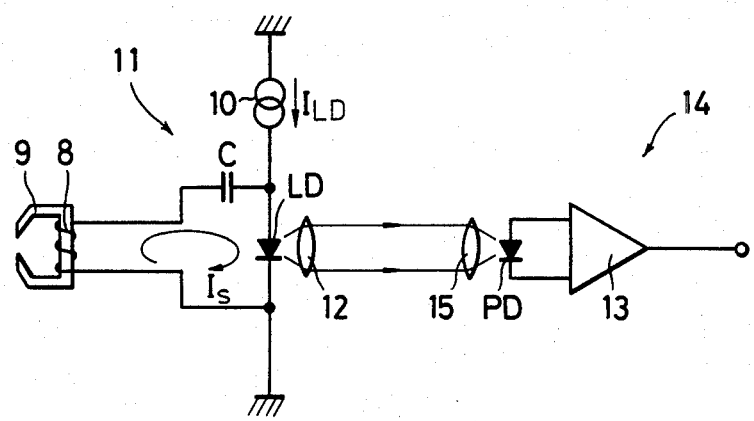
FIG. 2 is a circuit diagram of an important part of a VTR accoridng to a first embodiment of this invention.

In FIG. 2 showing a first embodiment of this invention, a rotational side circuit 11 consisting of a magnetic head 9, a capacitor C, a laser diode LD and a current source 10, is arranged in a rotary drum (not shown) of VTR. A coil 8 is wound on the magnetic head 9, and connected to the capacitor C and the laser diode LD. The current source 10 supplies a constant current $I_{LD}$. A lens 12 is arranged near the laser diode LD. A photoelectric conversion element such as a photo diode PD and a reproducing amplifier 13 are arranged in the stationary side of the VTR. A lens 15 is arranged near the photo diode PD.

Figure 3:
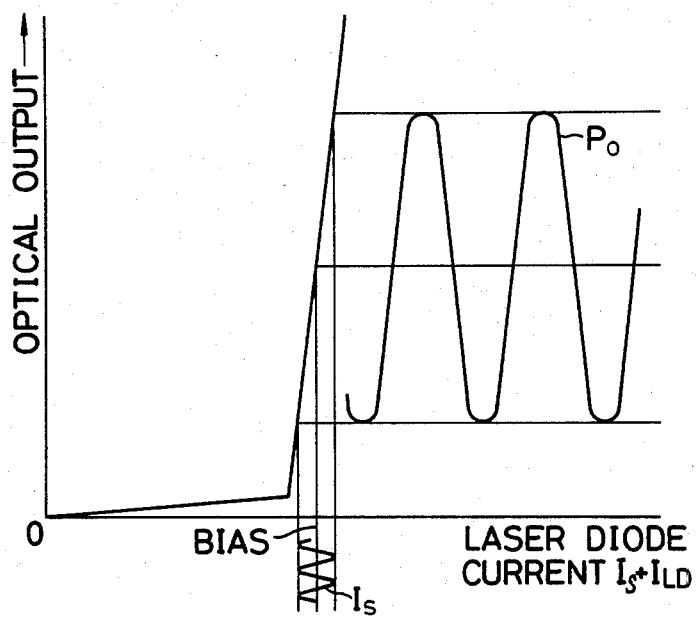
FIG. 3 is a graph showing the characteristic of a laser diode used in the embodiment.

In the above described circuit arrangement, signals are reproduced from the magnetic head 9 contacting a magnetic tape (not shown) in the reproducing mode of the VTR, when the rotary drum is rotated. Current $I_s$ of the reproduced signals flows through the loop consisting of the coil 8, the capacitor C and the laser diode LD. The constant current $I_{LD}$ as a bias current and the signal current $I_s$ flow through the laser diode LD. As the result, optical output $P_o$ is obtained from the laser diode LD. The relationship between the laser diode current $I_{LD}$ and the optical output $P_o$ is shown in FIG. 3.

In this embodiment, AlGaAs is used for the laser diode LD. It emits light of wave length 850 nm, and its differential efficiency $\eta_s$ is nearly equal to 0.3 mW/mA ($\eta_s \approx 0.3$ mW/mA). Output e(t) of the magnetic head 9 at the open receiving-end impedance is as follows:

$$e(t) = -(d\phi)/(dt) \rightarrow 2-3 \text{ mV}$$

The differential resistance of the laser diode LD is several ohms, and it is negligible in comparison with the impedance of the magnetic head 9. Usually, in the output impedance $Z_H(\omega) = j\omega L + r(\omega)$ of the magnetic head 9, $r(\omega) \approx 100\Omega$ and $L \approx 1\mu H$ at the frequency of 10 MHz. Under such condition, the noise factor S/N will be calculated in the laser diode direct drive type of FIG. 2.

$$i(\omega) = (e(\omega))/(Z_H(\omega)) \approx 25 \ \mu A$$

(Head output = 3 mV).

Therefore, optical output $P_o \approx 0.3$ (mW/mA) × 0.025 mA = 0.0075 mW. Generally, when the AMP constant of the 20 MHz band is considered, the noise factor S/N ≈ 55 dB at the receiving light level of about 6 $\mu W \sim 8 \ \mu W$. It can be improved by reduction of $r(\omega)$.

Figure 4:
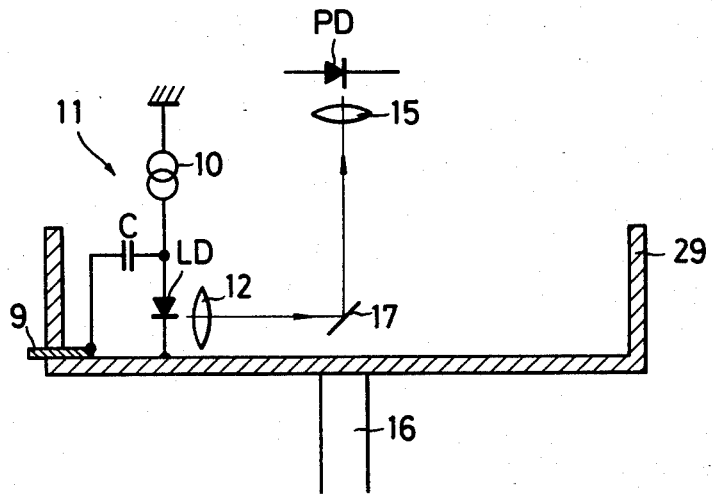
FIG. 4 to FIG. 6 are schematic views showing arrangements of the embodiment in the actual VTR.
Figure 5:
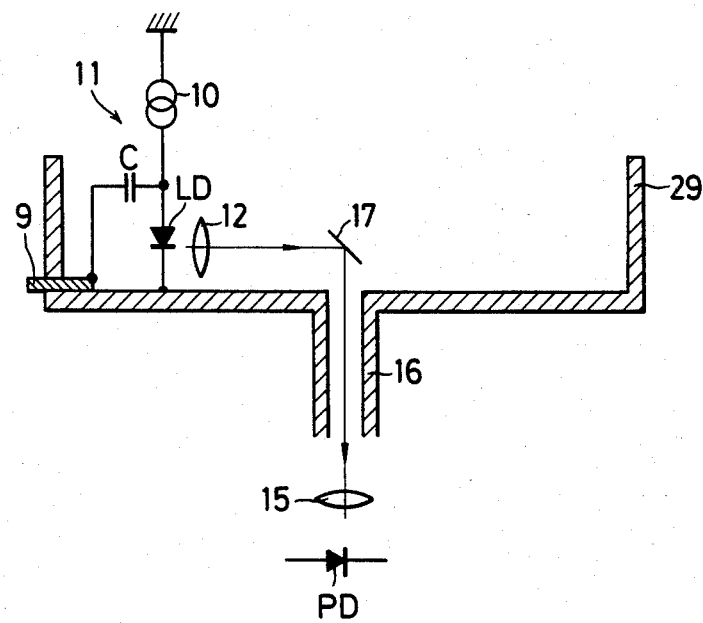
Figure 6:
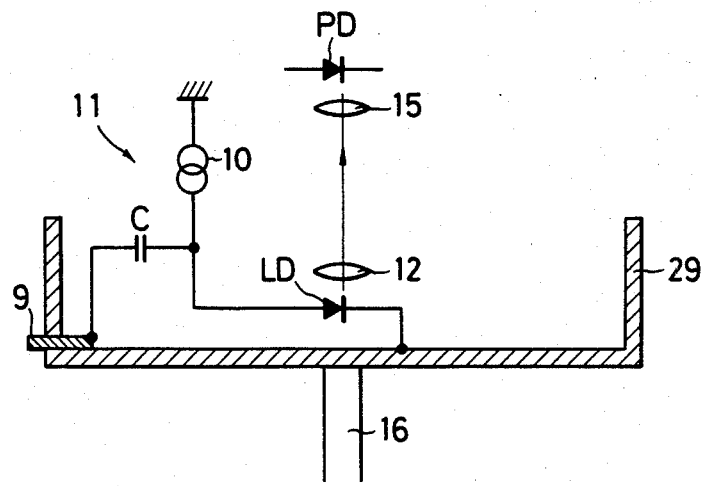

FIG. 4 to FIG. 6 show examples of the arrangements of the circuit system of FIG. 2 in the actual VTR. In FIG. 4 to FIG. 6, the rotational side circuit 11 is mounted on a rotary drum 29. The magnetic head 9 faces outwards. The rotary drum 29 is rotated with a shaft 16.

In FIG. 4 and FIG. 5, the optical output of the laser diode LD passes through the lens 12, and it is reflected by a mirror 17 at the right angle. Further, it passes through the lens 15 of the stationary side, and reaches the photo diode PD. The mirror 17, the lens 15 and the photo diode PD are aligned on the central axis of the shaft 16. In FIG. 5, the shaft 16 is hollow. Light passes the interior of the shaft 16.

In FIG. 6, light passes through the laser diode LD, the lenses 12 and 15 and the photo diode PD which are aligned on the central axis of the shaft 16. In FIG. 4 to FIG. 6, light may be transmitted through an optical guide material such as glass fiber between the lenses 12 and 15, and the mirror 17. Power source may be connected through a slip ring or the like.

FIG. 7 shows a second embodiment of this invention in which signals are recorded (REC) and reproduced (PB). Parts in FIG. 7 which correspond to those in FIG. 2 are denoted by the same reference numerals.

In this embodiment, a laser diode LD, of the rotational side functions as a laser emitting element in the reproducing mode or playback mode, and it functions as a laser receiving element in the recording mode. A recoridng/reproducing change-over relay switch 18, and amplifier 19, a relay coil 27 for the relay switch 18, a diode 28, etc., are arranged at the rotational side. A recording amplifier 20, a laser diode LD$_2$, a reproducing amplifier 21, a photodiode PD and a half mirror 22 are arranged at the stationary side. The rotational side and the stationary side are connected to each other through an optical guide material 23 such as optical fiber. Power sources +B and −B for playback and recording are selectively connected through a switch 24 to the rotational side.

In the recording mode of the above described circuit, the switches 18 and 24 are changed over to the recording contacts REC, and recording signals are supplied to the amplifier 20. The amplified recording signals from the amplifier 20 are converted into optical output by the laser diode LD$_2$, and the optical output is transmitted through the half mirror 24, the optical guide material 23 and the lens 12 to the laser diode ld, to be converted into electrical signals by the latter. The electrical signals from the laser diode ld, are transmitted through the switch 18 and the amplifier 19 to the magnetic head 9, and they are recorded on the magnetic tape from the magnetic head 9.

In the playback mode of the circuit of FIG. 7, the switches 18 and 24 are changed over to the playback contacts PB. The reproduced signals from the magnetic head 9 are supplied through the switch 18 to the laser diode LD$_1$, and they are converted into optical output by the laser diode LD$_1$. The optical output is transmitted through the optical guide material 23 and the half mirror 22 to the photodiode PD to be converted into electrical signals by the latter. The electrical signals are amplified by the amplifier 21. The amplified electrical signals are led out from an output terminal 26.

In the embodiment of FIG. 7, the laser diode LD$_1$ is used also as a photoelectric conversion element. However a photo diode may be separately provided in FIG. 7. In the recording mode, the output of the photo diode is supplied through the amplifier 19 to the magnetic head 9.

The VTR of this invention, as above described, includes the laser element which is connected in parallel with the winding of the magnetic head mounted on the rotary member (rotary drum), and to which constant current is supplied; the photoelectric conversion element (PD) arranged on the stationary part; and the light transmitting means (optical guide material, lens, mirror, etc.) coupling the laser element and the photoelectric conversion element. The reproduced signals from the magnetic head are led out from the photoelectric conversion element.

Thus, according to this invention, there is provided an optical rotary transformer of the laser diode direct drive type. All of the defects (1) to (3) of the conventional rotary transformer described in the Prior Art are removed by this invention. Signals can be reproduced and recorded with high efficiency and good S/N, and without cross talk.

While this invention is illustrated with specific embodiments, it will be recognized by those skilled in the art that modifications may be made therein without departing from the true scope of the invention as defined by the following claims.

What is claimed is:

1. A video tape recorder comprising: a rotary magnetic head drum having rotating means and a magnetic head mounted on said rotating means, said magnetic head including a coil and being adapted to record or reproduce video signal information on a magnetic tape; a laser element mounted on said rotating means; means for supplying a constant current to said laser element; means for electrically connecting said coil to said laser element, whereby said laser element is adapted to produce an optical output including optical video signals; stationary photoelectric conversion means means mounted in said video tape recorder; and optical transmission means for transmitting optical video signals between said laser element and said photoelectric conversion means.

2. A video tape recorder according to claim 1, in which a capacitor is connected in series with said coil.

3. A video tape recorder according to claim 1, in which said transmission means comprises a lens and a mirror.

4. A video tape recorder according to claim 1, in which said transmission means comprises an optical fiber.

5. A video tape recorder according to claim 1, in which said recorder further comprises a recording amplifier for supplying a recording signal to said magnetic head; means for connecting an output of said laser element to said recording amplifier; and stationary light emitting means mounted in said video tape recorder for emitting a light corresponding to a recording signal; said transmission means optically coupling said light emitting means with said laser element.

6. A video tape recorder, comprising:
rotary magnetic head means for recording or reproducing video signal information on a magnetic tape;
rotary optical signal means mounted for rotary motion with said magnetic head means;
stationary optical signal means;
means for electrically coupling said magnetic head means to said rotary optical signal means; and
optical transmission means for transmitting optical video signals between said rotary optical signal means and said stationary optical signal means.

7. A video tape recorder according to claim 6, in which said stationary optical means includes photoelectric conversion means.

8. A video tape recorder according to claim 6, in which said rotary optical signal means includes a laser diode.

9. A video tape recorder according to claim 6, in which said stationary optical signal means includes a photo diode.

10. A video tape recorder according to claim 6, wherein said transmission means includes at least one lens.

11. A video tape recorder according to claim 6, further comprising recording means for transmitting a signal to be recorded to said stationary optical signal means;

reproducing means for receiving a reproduced signal from said stationary optical signal means; and selection means for alternatively coupling said stationary optical signal means to either said recording means or said reproducing means.

12. A video tape recorder according to claim 6, wherein said transmission means includes optical fiber means.

* * * * *